United States Patent
Herrin

[11] 3,931,524
[45] Jan. 6, 1976

[54] SCANNING APPARATUS

[75] Inventor: Carlos B. Herrin, Bellbrook, Ohio

[73] Assignee: Monarch Marking Systems, Inc., Dayton, Ohio

[22] Filed: Oct. 4, 1974

[21] Appl. No.: 512,824

Related U.S. Application Data

[63] Continuation-in-part of Ser. No. 425,395, Dec. 21, 1973, abandoned.

[52] U.S. Cl............ 250/566; 235/61.11 E; 250/568
[51] Int. Cl.² .......................................... G06K 7/10
[58] Field of Search.................. 250/566, 568, 570; 235/61.11 E

[56] References Cited
UNITED STATES PATENTS

| | | | |
|---|---|---|---|
| 3,413,447 | 11/1968 | Lamers | 250/566 |
| 3,474,234 | 10/1969 | Rieger | 250/566 |
| 3,735,142 | 5/1973 | Harr | 235/61.11 E |

*Primary Examiner*—James W. Lawrence
*Assistant Examiner*—D. C. Nelms
*Attorney, Agent, or Firm*—Joseph J. Grass

[57] ABSTRACT

There is disclosed apparatus for scanning a concave coded record which is adapted to be disposed in the inside of an open-ended tube. A rotor carries a source of illumination which illuminates the record. Light reflected from the record is reflected onto a mirror carried by the rotor and passes along the axis of rotation of the rotor through a suitable lens or lenses and is focused on a mask. The mask has an aperture through which light passes to a light receptor such as a photodetector. The light receptor is stationarily mounted to the frame. The frame also mounts a motor for driving the rotor and bearings for rotatably mounting the rotor. A cover adapted to abut the end of the tube is mounted for movement between one position in which the cover is in the reflected light path and another position in which the cover is out of the reflected light path. A spring normally urges the cover into the one position but when the cover is moved into contact with the end of the tube the cover is moved to the other position at which the light receptor can receive light reflected from the coded record.

20 Claims, 6 Drawing Figures

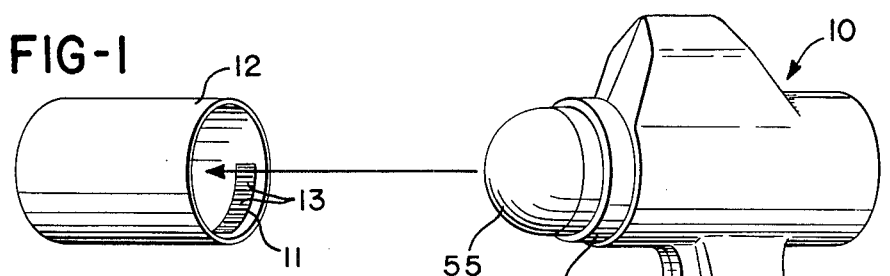
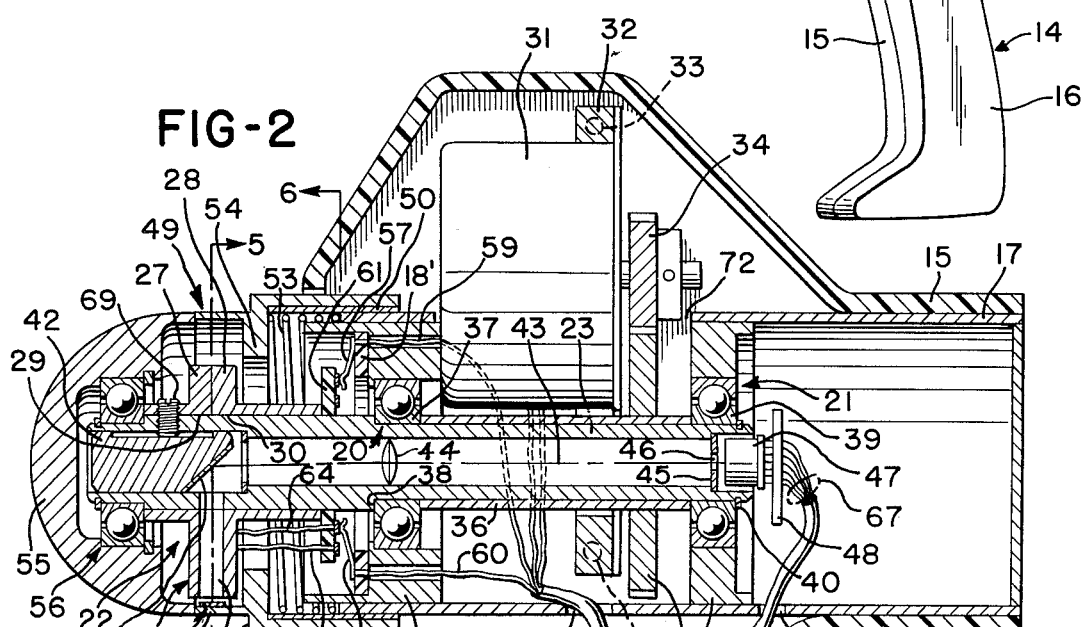
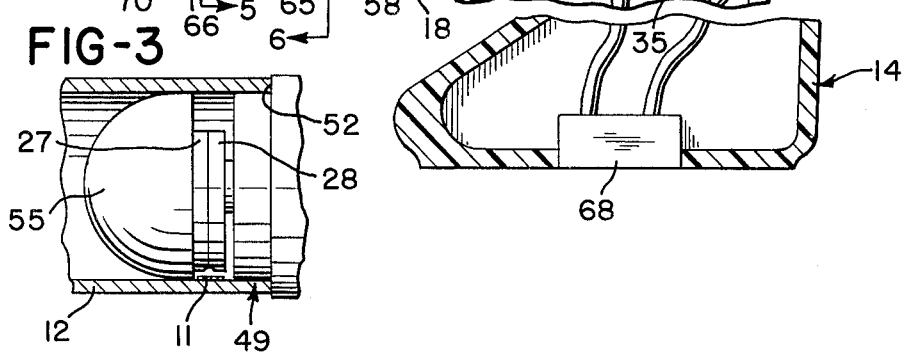
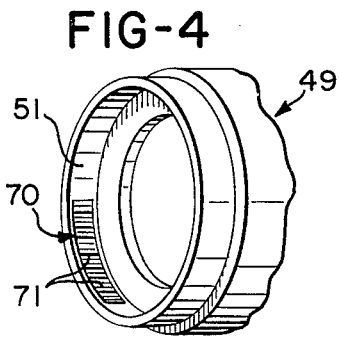
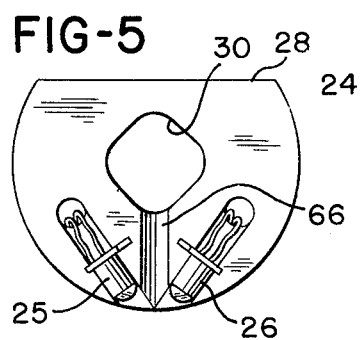
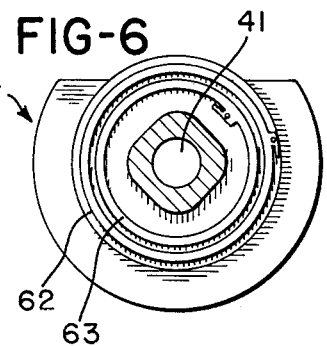

SCANNING APPARATUS

CROSS-REFERENCE TO RELATED APPLICATIONS

The present application is a continuation of application Ser. No. 425,395, filed Dec. 21, 1973, now abandoned. Certain subject matter disclosed and claimed in the present application is also disclosed in copending U.S. application Ser. No. 425,396, filed Dec. 21, 1973, owned by the assignee of the present application.

BACKGROUND OF THE INVENTION

1. Field of the Invention

This invention relates to the art of optical readers.

2. Brief Description of the Prior Art

The prior art includes the optical reader disclosed in U.S. Pat. application Ser. No. 104,894, filed Jan. 8, 1971, now abandoned, and continuation application Ser. No. 330,937, filed Feb. 9, 1973, now U.S. Pat. No. 3,809,893 owned by the assignee of the present application, and the following U.S. patent Nos.: 2,899,856; 3,211,593; 3,279,460; 3,286,087; 3,418,456; 3,474,234; 3,585,367; 3,636,317; 3,685,723; 3,689,744; and 3,720,193.

SUMMARY OF THE INVENTION

The purpose of the invention is to provide apparatus capable of reading or scanning a concave coded record such as a label adhered to the inner surface of a circular cylindrical, open-ended tube. A specific embodiment of the apparatus comprises a rotor rotatable in bearings about a rotational axis, an electric motor or driving the rotor, a light source carried by the rotor, a mirror rotatable as a unit together with the rotor, a lens for gathering reflected light and imaging the light on a mask, the mask having a light aperture through which light passes to a light receptor such as a stationary photoamplifier, and a tip for facilitating entry of the rotor into the tube. The rotor comprises a tube in which the mirror and lens are mounted, there being means for focusing the lens. The apparatus further comprises a frame having a handle by which the apparatus can be manually moved toward and into reading relationship relative to the coded record.

Brief Description of the Drawings

FIG. 1 is a perspective view of apparatus in accordance with a specific embodiment of the invention, together with a tube having a concave coded label extending in a circumferential direction on the inner surface of a circular cylindrical tube;

FIG. 2 is a sectional elevational view of the apparatus shown in FIG. 1;

FIG. 3 is an elevational view showing the front end of the apparatus received in an open-ended tube;

FIG. 4 is a fragmentary perspective view of a cover shown in FIGS. 1, 2 and 3;

FIG. 5 is a sectional view taken along line 5—5 of FIG. 2; and

FIG. 6 is a sectional view taken along line 6—6 of FIG. 2.

Detailed Description of the Preferred Embodiment

Referring initially to FIG. 1, there is shown an optical reader 10 for reading or scanning coded data on a record 11 disposed on the inside of an open-ended circular cylindrical tube 12. The data is shown to be comprised of code bars 13 disposed parallel to the tube axis. The record 11, in the illustrated embodiment, is a pressure-sensitive label adhered to the inner surface of the tube 12 and extends in the circumferential direction. As such, the record 11 has a concave configuration.

The optical reader 10 is shown to have a frame generally indicated at 14 comprised of mating sections 15 and 16. The sections 15 and 16 receive a generally circular cylindrical tube 17. The tube 17 receives and mounts annular, spaced-apart, mounting members 18 and 19. The mounting members 18 and 19 mount respective ball bearings 20 and 21. The bearings 20 and 21 rotatably mount a rotor generally indicated at 22. In the illustrated embodiment the rotor 22 is shown to include a tube 23 and a holder 24 for a light source comprised of light bulbs or light emitting diodes 25 and 26. The holder 24 is comprised of a pair of sections 27 and 28 received about the tube 23 and suitably adhered to each other. The portion of the tube 23 near the front end of the apparatus 10, that is, to the left of the ball bearing 20 as viewed in FIG. 2, is generally square at its outer surface. The sections 27 and 28 have respective internal holes 29 and 30 which are correspondingly generally square. This non-circular configuration prevents the sections 27 and 28 from rotating relative to the tube 23.

An electric constant speed motor 31 is secured to the section 15 by a bracket 32 as by screws 33. The motor 31 drives a pinion gear 34 which meshes with and drives a gear 35. The gear 35 receives and is suitably secured against rotation relative to a sleeve 36. The sleeve 36 in turn receives and is suitably secured against rotation relative to the tube 23. Inner race 37 of the ball bearing 20 abuts a shoulder 38 of the tube 23 and one end of the sleeve 36. Inner race 39 of the bearing 21 abuts a C-ring 40 and the other end of the sleeve 36.

The tube 23 also carries a mirror 41 provided by coating a base or support 42 with a highly reflective material. The base 42 is adjustable lengthwise of the tube 23 along its rotational axis 43. The tube also mounts a lens 44 and a mask 45. A system of one or more lenses can be employed, if desired. The mask 45 has a light aperture 46. A light receptor 47 in the form of a commercially available photoemplifier is stationarily secured to the inside of the tube 17 by a bracket 48. Clearance is provided so that the rotor 22 does not contact the light receptor 47 as the rotor 22 rotates. In that the light receptor 47 is stationary any possibility of electrical noise as would be created by using slip rings is obviated.

A cover 49 is movably mounted on the tube 17. The cover 49 is telescopically disposed relative to the tube 17. A bearing sleeve 50 is disposed between the tube 17 and the cover 49. The cover 49 has a generally circular cylindrical configuration. The front end of the cover 49 has a circular cylindrical section 51 and an annular shoulder 52. A spring 53 disposed between the end of the tube 17 and a flange 54 normally urges the terminal end of the cover section 51 against the rear end of a generally hemispherical converging tip 55. The tip 55 is rotatably mounted on the end portion of the tube 23 by a ball bearing 56.

Electrical energy is supplied to the pair of multielement brushes 57 and 58 via conductors 59 and 60. The brushes 57 and 58 are mounted on a brush holder 18 secured to mounting members 18. The brushes contact a slip ring 61 having a pair of annular contacts 62 and 63. The slip ring 61 is secured to the tube 23. The contacts 62 and 63 are connected by conductors 64 and 65 to the lamps or light emitting diodes 25 and 26. When the tip 55 is inserted into the tube 12, the shoulder 52 abuts the end of the tube 12 and the force exerted by the tube 12 causes the compression spring 53 to compress as the cover 49 is moved to the position shown in FIG. 3. There is a sufficient amount of clearance between the inside of the tube 12 and the maximum diameter of the tip 55 to enable the tip 55 to be freely inserted to the FIG. 3 position. Light from the lamps 25 and 26 is directed at and illuminates the coded record 11 to read the coded data. Light reflected from the record 11, passes through a passageway 66, onto the mirror 41, and the mirror 41 bends the reflected light along the rotational axis 43. The reflected light is gathered by the lens and is imaged on the mask 45. Some of the imaged light can pass through the aperture 46 onto the light receptor 47. Electrical energy is conducted to the light receptor or photoamplifier 47 by some of conductors 67 and an analog signal 47 generated by the photoamplifier 47 is conducted from the photoamplifier 47 by the remaining conductors 67. The conductors 59, 60 and 67 are connected to a multi-element electrical connector 68.

It is noted that although the apparatus 10 includes a handle H, the apparatus 10 can be mounted in an apparatus that is moved mechanically relatively toward and away from a tube 12.

The mirror 41 is adjustable in the direction of the rotational axis 43 by loosening set screw 69, shifting the base 42 relative to the lens 44, and thereafter tightening the screw 69. This adjustment of the mirror 41 can be used to focus the lens so that the light is more clearly imaged on the mask 45. If desired, focusing of the lens 44 can also be accomplished by adjusting the lens 44 or the mask 45. Although the mirror 41 is illustrated as bending the reflected light through an angle of 90°, as is preferred, the light can be bent at other angles so long as the light reflected from the mirror or other light bending device is passed along the axis of rotation 43. While a light bending device such as a prism (not shown) can be employed instead of a mirror this is not the preferred construction.

If desired the lens 44 and the mask 45 can be stationarily mounted.

So long as the cover 49 is in the position shown in FIG. 2 the cover section 49 is in the reflected light path. But as soon as the cover 49 is moved into the position shown in FIG. 3, the cover 49 moves out of the reflected light path and the record 11 is read as the rotor 22 and the mirror 41 which it carries rotate.

A record 70 having code bars 71 is adhered to the inner surface of the cover section 51. The data on the record 70 is check data which indicates to the utilization device (not shown) which receives the analog signal that the apparatus is functioning.

It is noted that the tube 17 has certain cut-outs 72, 73 and 74 to allow space for the motor 31 and gear 34, and the conductors 59 and 60, and 67.

Instead of using lamp or light emitting diodes 25 and 26, light can be brought from an annular stationary, light diffusing ring (not shown) composed of a plastics or glass material such as is sold commercially under the name Lucite. The ring can be suitably lighted and can be disposed at the end of the tube 23 adjacent the ring. Optical fibers (not shown) extending through and rotatable as a unit with the rotor tube 23 and the rotor 24 would be optically coupled to the ring and would direct light onto the record adjacent the open end of the passageway 66.

By way of example, not limitation, the electric motor continuously rotates the rotor 22 through between about 30 and 240 revolutions per minute.

Other embodiments and modifications of this invention will suggest themselves to those skilled in the art, and all such of these as come within the spirit of this invention are included within its scope as best defined by the appended claims.

I claim:

1. Apparatus for scanning a concave coded record, comprising: a rotor having a rotational axis, means carried by the rotor for illuminating the coded record, a light receptor in alignment with the rotational axis, means carried by the rotor for receiving light reflected from the concave record inwardly toward the rotational axis and for bending the reflected light toward the light receptor, and means for driving the rotor to scan the concave record.

2. Apparatus as defined in claim 1, wherein the means for receiving and bending the reflected light includes a mirror, lens means disposed between the mirror and the light receptor, and a mask having an aperture disposed between the lens means and the light receptor.

3. Apparatus as defined in claim 1, wherein the means for receiving and bending the reflected light includes a mirror, a mask disposed between the mirror and the light receptor and having an aperture disposed along the rotational axis, lens means disposed between the mirror and the mask for imaging reflected light on the mask, and means for enabling adjustment of the position of the mirror to focus the image on the mask.

4. Apparatus as defined in claim 1, wherein the means for receiving and bending the reflected light includes a mirror.

5. Apparatus as defined in claim 1 and adapted to read the coded record while on the inside surface of a tube, a converging tip for facilitating entry of the light receiving and bending means into the tube, and means for rotatably mounting the tip on the rotor.

6. Apparatus as defined in claim 1, wherein the light receptor is stationarily mounted.

7. Apparatus as defined in claim 1, wherein the rotor comprises an elongated tube, ball bearings for rotatably mounting the tube, the light receiving and bending means being disposed in the tube, and an opening in the tube through which the reflected light passes to the light receiving and bending means.

8. Apparatus as defined in claim 7, wherein the light receptor is stationarily mounted.

9. Hand-held apparatus for scanning a concave coded record, comprising: a frame having a handle, a rotor mounted by the frame and having a rotational axis, an electric motor drivingly connected to the rotor, means carried by the rotor for illuminating the coded record, a stationary light receptor mounted by the frame in alignment with the rotational axis, and means carried by the rotor for receiving light reflected from the concave record inwardly toward the rotational axis and for bending the reflected light toward the light receptor.

10. Hand-held apparatus as defined in claim 9, wherein the rotor comprises an elongated tube, the light receiving and bending means comprises a mirror disposed in the tube, lens means disposed in the tube between the mirror and the light receptor, and a mask mounted in the tube between the lens means and the light receptor and having a light aperture disposed along the rotational axis.

11. Apparatus for scanning a concave coded record, comprising: a frame, a rotor having a rotational axis, means for rotatably mounting the rotor on the frame, an electric motor mounted on the frame, means for drivingly connecting the electric motor and the rotor, the rotor comprising an elongated tube, the tube having a first opening disposed radially outward of the rotational axis and a second opening disposed in alignment with the rotational axis, lens means mounted in the tube, a mirror mounted in the tube, means carried by the rotor for illuminating the coded record, a light receptor aligned with the second opening, the lens means being disposed between the mirror and the light receptor, the mirror and the first opening being in optical alignment relative to the rotational axis and the mirror being disposed to reflect the light from the coded record along the rotational axis onto the light receptor.

12. Apparatus as defined in claim 11, wherein the light receptor is mounted on the frame.

13. Apparatus as defined in claim 11, wherein the light receptor as a photoamplifier.

14. Apparatus as defined in claim 11, including means for focusing the lens means.

15. Apparatus for scanning a concave coded record, comprising: a frame, a rotor having a rotational axis, means for rotatably mounting the rotor on the frame, an electric motor mounted on the frame, means for drivingly connecting the electric motor and the rotor, the rotor comprising an elongated tube, the tube having a first opening disposed radially outward of the rotational axis and a second opening disposed in alignment with the rotational axis, lens means mounted in the tube, a mirror carried by the rotor, means for illuminating the coded record, a light receptor aligned with the second opening, the lens means being disposed between the mirror and the light receptor, the mirror and the first opening being in optical alignment relative to the rotational axis and the mirror being disposed to reflect the light from the coded record along the rotational axis onto the light receptor.

16. Apparatus as defined in claim 15, wherein the light receptor is mounted on the frame.

17. Apparatus as defined in claim 15, wherein the light receptor is a photoamplifier.

18. Apparatus as defined in claim 15, including means for focusing the lens means.

19. Apparatus for scanning a concave coded record, comprising: a frame, a rotor mounted by the frame and having a rotational axis, an electric motor drivingly connected to the rotor, means for illuminating the coded record, a stationary light receptor mounted by the frame in alignment with the rotational axis, a mirror carried by the rotor for receiving light reflected from the concave record inwardly toward the rotational axis and for bending the reflected light toward the light receptor, and a lens carried by the rotor and disposed between the mirror and the light receptor.

20. Apparatus for scanning a concave coded record, comprising: a frame, a rotor mounted by the frame and having a rotational axis, an electric motor drivingly connected to the rotor, means for illuminating the coded record, a stationary light receptor mounted by the frame in alignment with the rotational axis, a mirror carried by the rotor for receiving light reflected from the concave record inwardly toward the rotational axis and for bending the reflected light toward the light receptor, a lens carried by the rotor and disposed between the mirror and the light receptor, and a mask carried by the rotor between the lens means and the light receptor and having a light aperture disposed along the rotational axis.

* * * * *